Aug. 14, 1934.                L. LAUBENDER                 1,970,382
                        INTERNAL COMBUSTION ENGINE
                           Filed Aug. 30, 1930        2 Sheets-Sheet 1
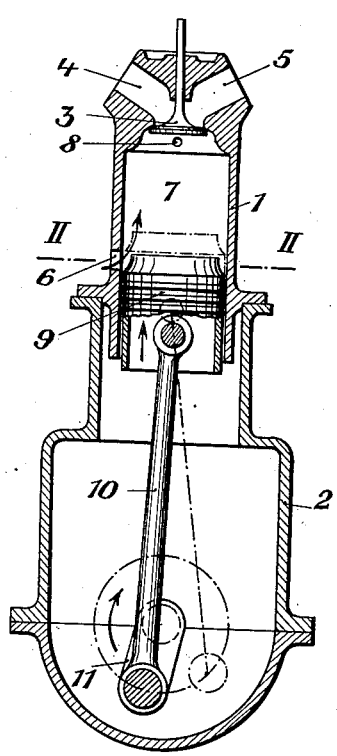
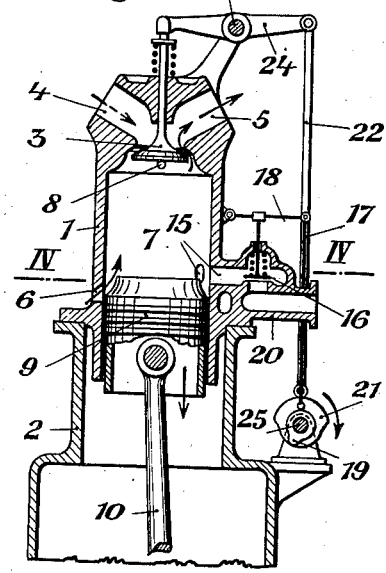
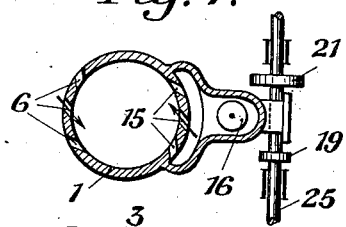
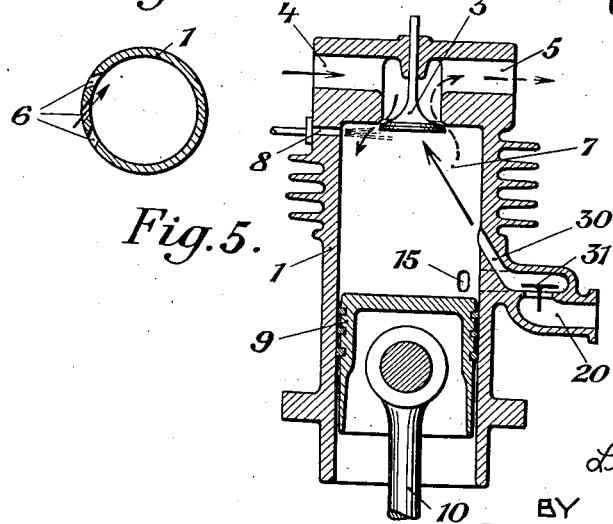
INVENTOR:
Ludwig Laubender
BY
Pennie Davis Marvin + Edmonds
ATTORNEY.

Aug. 14, 1934.　　　L. LAUBENDER　　　1,970,382
INTERNAL COMBUSTION ENGINE
Filed Aug. 30, 1930　　　2 Sheets-Sheet 2

Patented Aug. 14, 1934

1,970,382

UNITED STATES PATENT OFFICE 1,970,382

INTERNAL COMBUSTION ENGINE

Ludwig Laubender, Winterthur, Switzerland, assignor to the firm of Sulzer Freres Societe Anonyme, Winterthur, Switzerland Application August 30, 1930, Serial No. 479,049
In Switzerland September 5, 1929

5 Claims. (Cl. 123—79)

This invention relates to internal combustion engines of the four-stroke Diesel type provided with a common valve serving to control both the admission of air and the discharge of the products of combustion.

In such engines if the common valve is closed exactly at the end of the suction stroke the cylinder has not received its full charge of air. On the other hand if the valve remains open during the first portion of the compression stroke, although more air will be admitted the maximum charge of air in the working chamber will be reduced by the travel of the piston during the compression stroke. Further, for certain, for example, mechanical reasons sudden opening or closing of the valves has to be avoided so that the valves must be made to close in a gradual manner which adversely affects the charge.

Although ports, unlike openings controlled by valves, can be made to give a quick cut off, hitherto it has not been possible in engines of the above type to charge the cylinder fully with air and it is the object of this invention to provide an engine which will be free from this disadvantage.

According to this invention additional air ports independent of the common valve are provided through which air can be supplied to the cylinder at the beginning of or after the closing of the common valve so as to compensate for the gradual closing of the common valve by air admitted through ports which can be suddenly closed. Preferably this air is admitted through ports which are uncovered when the piston is at the end of the cylinder remote from the common valve and some of these ports may be provided with one or more automatically acting valves. Alternatively some of the ports may be valve-controlled so that air can be admitted through some ports whilst others, also valve controlled, can be used for the discharge of the products of combustion.

Three constructions according to this invention are diagrammatically illustrated by way of example in the accompanying drawings, in which Figure 1 shows in vertical sectional elevation a four-stroke Diesel engine adapted for airless or solid injection of fuel, Figure 2 is a cross-section on the line II—II of Figure 1, Figure 3 shows a modified construction in vertical section, Figure 4 is a cross-section on the line IV—IV of Figure 3, and Figure 5 shows in vertical section an alternative form of engine cylinder.

Figure 6:
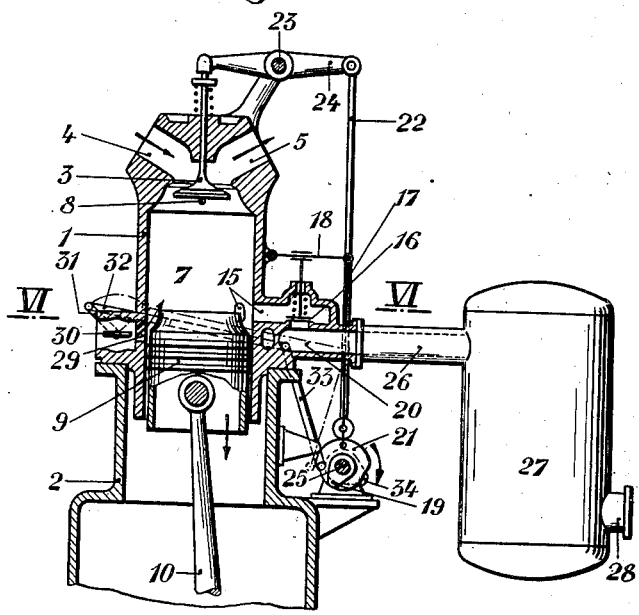
Fig. 6 is a longitudinal section through a working cylinder in two positions of controlled slots.

In the construction shown in Figures 1 and 2 the cylinder 1 which is secured to the crank case 2 is provided with a common valve 3 which controls both the admission of air through the opening 4 and the discharge of the products of combustion through the opening 5. In addition the cylinder wall is provided with ports 6 which (see Figure 2) open tangentially into the working chamber.

The piston 9 is shown at the beginning of its compression stroke in Figure 1, the valve 3 being closed. When the piston begins to cover the ports 6 as shown by dotted lines the working chamber 7 is completely charged with air. Towards the end of the compression stroke fuel introduced through an injection device 8 is automatically ignited and the pressure thus generated is transmitted by the piston 9 and connecting rod 10 to the crank 11 in the usual manner.

The valve 3 opens before the ports 6 are uncovered so that the products of combustion escape through the opening 5. After pressure equalization has taken place fresh air is admitted through the ports 6 into the working chamber and during the exhaust stroke this air is expelled from the cylinder with the products of combustion.

With the suction stroke admission of fresh air through the opening 4 begins and when the piston occupies the position shown in dotted lines and begins to uncover the ports 6 the valve 3 is closed so that the cylinder receives its full charge of air through these ports and the maximum quantity of air will be available to assist combustion.

In the construction shown in Figure 3 in addition to the ports 6 further ports 15 are provided at a higher level. A valve 16 actuated by a cam 19 on the cam shaft 25 through rod 17 and lever 18 enables the working chamber of the cylinder to be cut off from the air pipe 20. A second cam 21 on the cam shaft controls the common closing valve 3 through a rod 22 and a double-ended lever 24 pivoted at 23. The air admitted into the cylinder through the ports 15 is preferably at a higher pressure than the other air so that after being charged with air through the opening 4 and when the ports 6 have been closed supercharging can take place through the ports 15.

Figure 3 shows the piston 9 nearly at the end of the expansion stroke just before the lower dead centre. The valve 3 is open, the waste gases therefore can escape through the opening 5 and the pressure within the cylinder is lowered so that air can enter the cylinder through the ports 6. The valve 16 is still closed so that no air can enter the cylinder through the ports 15 although they are uncovered by the piston 9.

During the upstroke of the piston, any combustion gases remaining in the chamber will be swept out through the opening 5. When the suction stroke begins the cylinder is filled with air which is first admitted through the opening 4, then through the ports 6 and finally, after the valve 16 has been opened by the valve gear, through the ports 15. The common valve is preferably closed before the piston uncovers the ports 6 in its outward stroke.

Towards the end of the compression stroke fuel is injected through a nozzle 8 into the compressed charge which is ignited owing to the high temperature which the fuel has reached through compression, the expansion or working stroke being thus produced. Towards the end of this working stroke the valve 3 is opened so that the waste gases will pass through the opening 5 either into the open or into an exhaust passage whereupon the cycle already described will be repeated.

Figure 4 shows the cam 19 by which the valve 16 is operated and also the second cam 21 which actuates the common valve 3, both these cams being mounted on the cam shaft 25. Instead of a positively operated valve any automatically acting valve may be employed. The ports 6 and 15 are arranged tangentially to the cylinder so that air is admitted through each of them in the same direction. Some of the ports may be inclined at an angle to the radial direction. If desired the ports may be provided with separate control devices such as non-return valves some of which may be used only to admit air whilst others only allow the exhaust gases to escape, thus enabling the engine to be worked even if the common valve 3 becomes jammed. Some of the ports may be directed towards the cylinder head or common valve and others may extend in a plane at right angles to the axis of the cylinder.

In the construction shown in Figure 5 the piston 9 reciprocates within a cylinder 1 which is made in one piece and is provided with a valve 3 which controls both the admission of air and the discharge of waste gases. The surface of the valve 3 directed towards the air inlet opening 4 is constantly cooled by the air whilst the surface which closes the opening in the upper wall of the cylinder is located close to the ignition zone and therefore remains at a high temperature.

This results in the valve being deformed so that after a time it does not seat itself properly and it is the object of the present invention to obviate this drawback.

According to this invention separate openings 30 are formed in the engine cylinder through which cooling air is directed against the inner surface of the valve, the openings 30 being inclined towards this valve surface. To prevent the products of combustion from entering the pipe 20 through which this cooling air is admitted a valve 31 is provided which can be positively operated if desired.

In the drawings the piston 9 is shown in its lowest dead centre position in which the valve 3 is already closed although air can still enter the cylinder through additional ports 15 and 30. This additional air cools the valve 3 and is compressed during the compression stroke. Fuel introduced into the cylinder at the end of the compression stroke through the nozzle 8 is ignited owing to the high temperature due to the compression of the charge, and ignition causes the piston to descend thus transmitting the force acting upon it through the connecting rod 10 to the crank (not shown) in the usual manner.

When the pressure in the cylinder is sufficiently low cooling air for the valve 3 will enter through the ports 15 and 30 so that the valve which has been raised to a high temperature at the moment of ignition, will be thoroughly cooled. Consequently during the exhaust stroke not only the hot gases but also fresh air come into contact with this valve and during the suction stroke of the piston the valve remains open and will again be thoroughly cooled at the end of the suction stroke by the air entering through the ports 15 and 30. As these ports are open for a relatively long period the heating of the incoming air is prevented.

Figure 7:
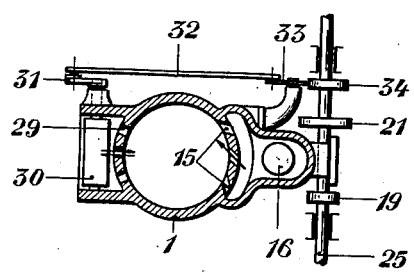
Fig. 7 is a section through line VI—VI of Fig. 6.

In Fig. 6 the air line 20 is connected by means of pipe 26 with the pressure vessel 27 to which the air is supplied through the nipple 28 from a compressor (not shown). Whilst the slots 15 are disposed at an angle relatively to the diameter, the slots 29 (Fig. 7) extend radially. The slots 29 are provided with a flow-intercepting element 30 which latter enables the combustion gases to make their exit and which is driven by means of lever 31, rod 32, and lever 33 from the cam disc 34.

I claim:

1. In a four-stroke Diesel internal combustion engine having a cylinder, a piston therein, a common valve controlling both the admission of air and the discharge of the products of combustion, the combination with said valve of additional, quickly-closing, piston-controlled air-admission ports, independent of the common valve, for supplying air to the cylinder near the time of the closing of the common valve, some of said additional ports being provided with a control valve and being uncovered by the piston before the other ports in the cylinder.

2. In a four-stroke Diesel internal combustion engine having a cylinder, a piston therein, a common valve for controlling both the admission of air and the discharge of the products of combustion, the combination with said valve of additional, quickly-closing, piston-controlled air-admission ports, independent of the common valve, for supplying air to the cylinder near the time of the closing of the common valve, some of said ports being provided with a valve permitting the admission of air, the others having a valve which permits the exhaust gases to escape.

3. In a four-stroke Diesel internal combustion engine having a cylinder, a piston therein, a common valve controlling both the admission of air and the discharge of the products of combustion, the combination with said valve of additional, quickly-closing, piston-controlled air-admission ports, independent of the common valve, for supplying air to the cylinder near the time of the opening of the common valve, some of said ports being provided with a valve permitting the admission of air, the others having a valve which permits the exhaust gases to escape.

4. In a four-stroke Diesel internal combustion engine having a cylinder, a piston therein, a common valve controlling both the admission of air and the discharge of the products of combustion, the combination with said valve of additional, quickly-closing, piston-controlled air-admission ports, independent of the common valve, for supplying air to the cylinder near the time of the closing of the common valve, the additional air being introduced into the cylinder, to cool the common valve, through independent openings in the cylinder wall, said openings being directed towards that face of the common valve which is in contact with the charge at the moment of ignition.

5. In a four-stroke Diesel internal combustion engine having a cylinder, a piston therein, a common valve controlling both the admission of air and the discharge of the products of combustion, the combination with said valve of additional, quickly-closing, piston-controlled air-admission ports independent of the common valve, for supplying air to the cylinder near the time of the opening of the common valve, the additional air being introduced into the cylinder, to cool the common valve, through independent openings in the cylinder wall, said openings being directed towards that face of the common valve which is in contact with the charge at the moment of ignition.

LUDWIG LAUBENDER.